C. P. COTTRELL.
MACHINE FOR BACKING UP ELECTROTYPE SHELLS.
APPLICATION FILED JAN. 5, 1911.
1,034,881.
Patented Aug. 6, 1912.
2 SHEETS—SHEET 1.
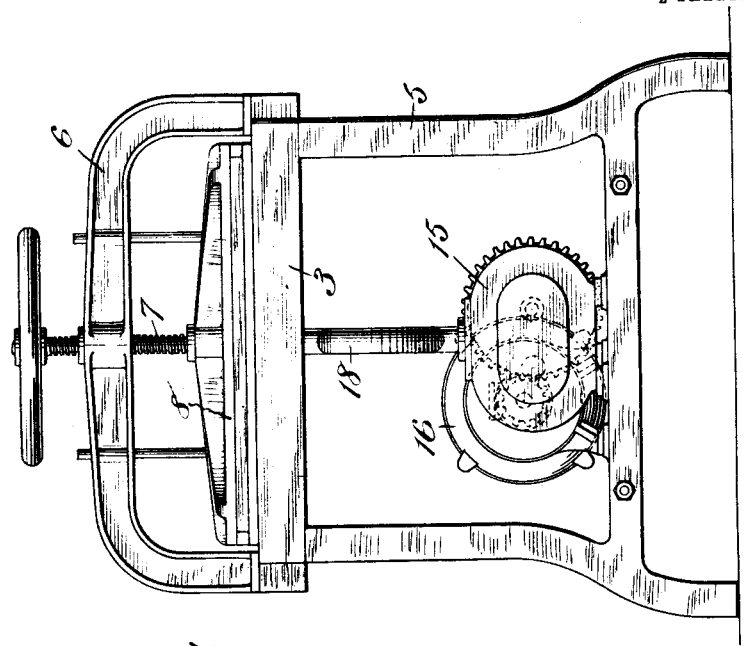
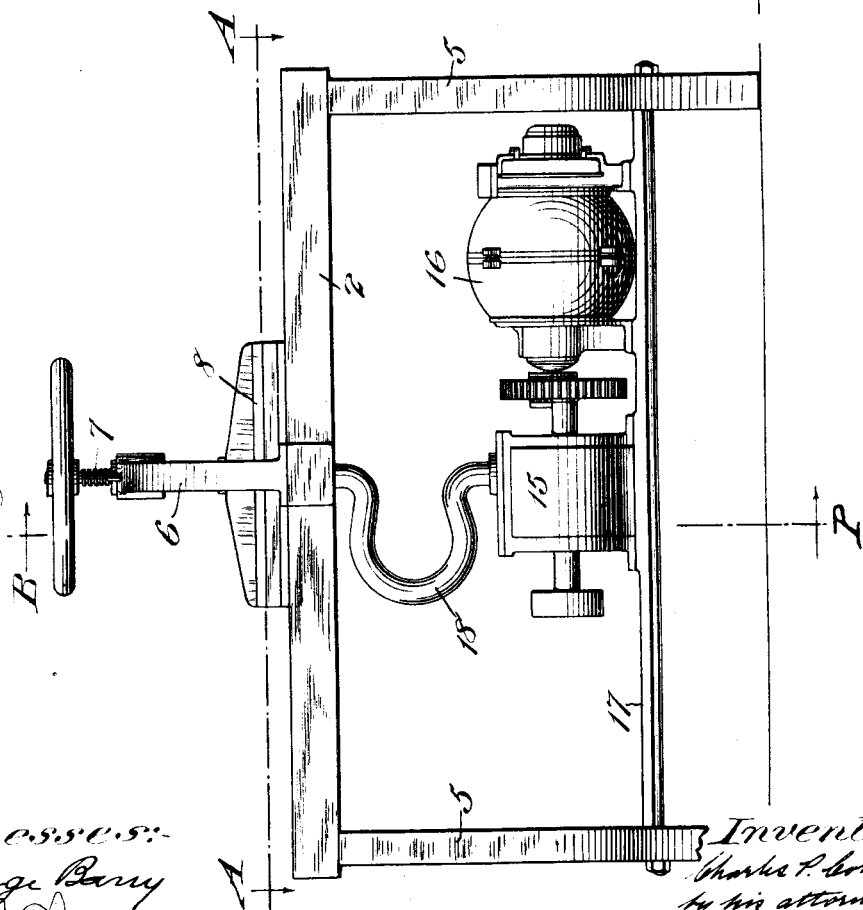

C. P. COTTRELL.
MACHINE FOR BACKING UP ELECTROTYPE SHELLS.
APPLICATION FILED JAN. 5, 1911.
1,034,881.
Patented Aug. 6, 1912.
2 SHEETS—SHEET 2.
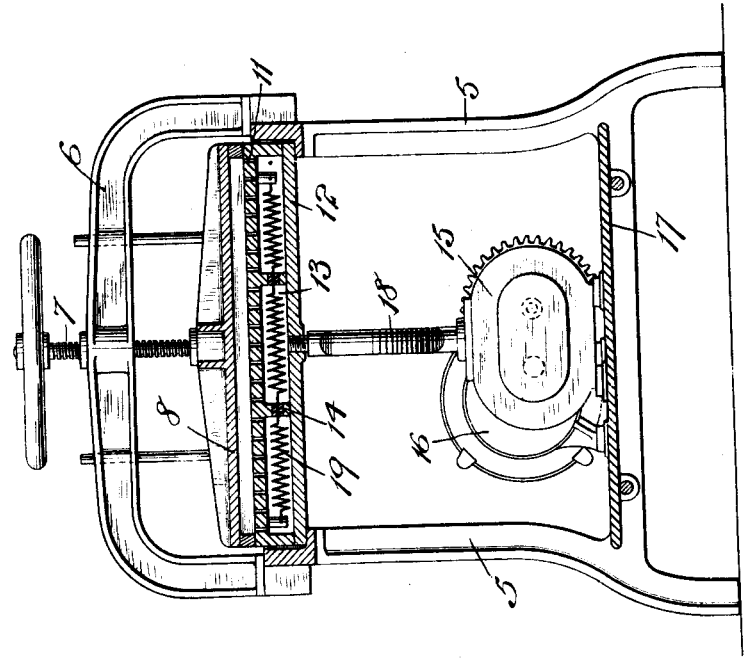
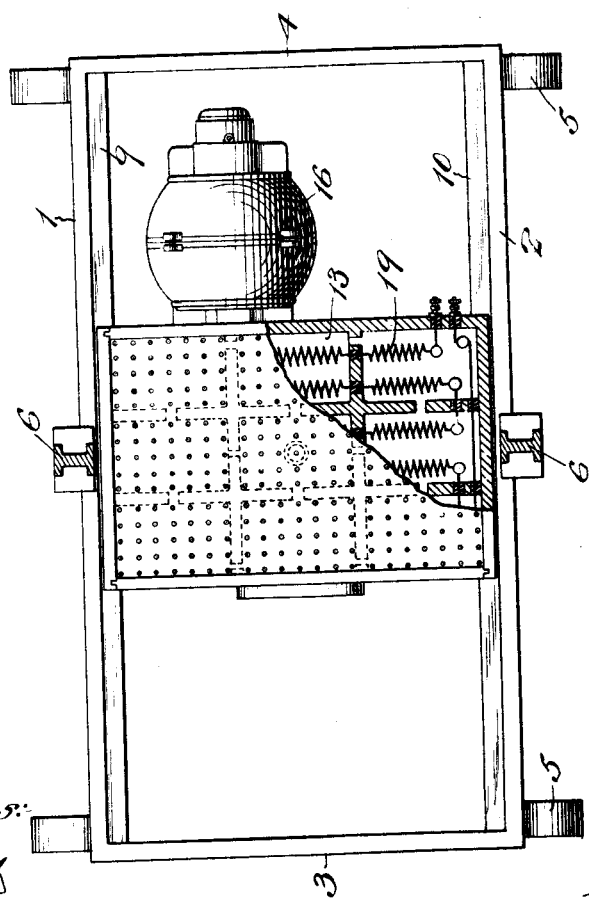

UNITED STATES PATENT OFFICE.

CHARLES P. COTTRELL, OF WESTERLY, RHODE ISLAND, ASSIGNOR TO C. B. COTTRELL & SONS COMPANY, OF NEW YORK, N. Y., A CORPORATION OF NEW JERSEY.

MACHINE FOR BACKING UP ELECTROTYPE-SHELLS.

1,034,881. Specification of Letters Patent. Patented Aug. 6, 1912.

Application filed January 5, 1911. Serial No. 600,979.

*To all whom it may concern:*

Be it known that I, CHARLES P. COTTRELL, a citizen of the United States, and resident of Westerly, in the county of Washington and State of Rhode Island, have invented a new and useful Improvement in Machines for Backing Up Electrotype-Shells, of which the following is a specification.

My invention relates to improvements in machines for backing up electrotype shells and has for its object to provide, in a machine of this character, a backing pan on which an electrotype shell with or without an interposed overlay may be held by suction during the casting of the backing up metal onto the shell to complete the plate.

My invention consists in a machine for backing up electrotype shells having a hollow backing pan, the top wall of which pan is perforated and the interior of which is connected to an exhaust pump whereby the electrotype shell resting upon the pan with or without an interposed overlay will be held snugly in engagement therewith whereby a more perfect electrotype plate may be produced than by the methods heretofore in common use, means being provided for heating the backing pan to the required temperature.

In the accompanying drawings, Figure 1 represents the machine in side elevation, Fig. 2 is an end view of the same, Fig. 3 is a horizontal section taken in the plane of the line A—A of Fig. 1, a portion of the perforated top wall of the backing pan being broken away to illustrate more clearly the vacuum chamber, the heating means and the strengthening partitions which connect the top and bottom walls of the pan, and Fig. 4 is a transverse vertical section taken in the plane of the line B—B of Fig. 1.

The backing up stand comprises side bars 1, 2, and end bars 3, 4, forming an open frame, which frame is supported by suitable legs 5. About midway the length of the stand, a yoke 6 uprises from the side bars 1 and 2 of the frame, in which yoke is mounted a hand screw 7 carrying a pressure plate or platen 8.

The hollow backing pan may be slid along the stand into and out of position beneath the platen 8, in the present instance by providing the side bars 1, 2, of the frame with tracks 9, 10, on which the opposite ends of the backing pan rest. This backing pan comprises a perforated top 11 and a bottom 12 spaced therefrom to form a vacuum chamber 13. Suitable strengthening partitions 14 are interposed between the top 11 and the bottom 12 of the backing pan for maintaining the top 11 in a perfectly flat condition by preventing the same from warping or sagging out of shape.

A motor driven exhaust pump serves to exhaust the air from the interior of the hollow backing pan, which pump is shown herein as a rotary exhaust pump 15 driven from an electric motor 16, both mounted upon a shelf 17 of the backing up stand, the pump 15 being connected to the interior of the backing pan through a flexible hose 18 so as to permit the pan to be moved from one end of the frame to the other without disconnecting it from the exhaust pump. Any suitable means may be provided for heating the backing pan to the desired temperature that shown herein comprising an electric device including resistance coils 19 located within the hollow space or chamber 13. Electric current may be supplied to this heating device from any suitable source of electrical energy not shown herein.

In operation, the electrotype shell is placed upon the perforated top of the heated hollow backing pan with or without a reverse overlay interposed between the face of the shell and the pan. The exhaust pump 15 may be put into operation for exhausting the air from the backing pan and thus exerting a suction upon the shell for holding the shell snugly in position on the pan. The backing up metal is then poured onto the back of the shell while the shell is held by suction against the backing pan. The pan is then allowed to cool thereby permitting the backing up metal to cool, while the electrotype shell is held by suction on the pan, thus insuring the formation of an electrotype plate of superior quality by a very simple means. If it is desired to exert pressure upon the backing up metal, the backing pan may be moved into position beneath the platen 8 and the platen screwed down into engagement with the metal for exerting pressure thereon.

It is evident that various changes might be resorted to in the construction, form and arrangement of the several parts without departing from the spirit and scope of my invention; hence I do not wish to limit myself strictly to the structure herein set forth, but

What I claim is:—

1. In a machine of the character described, an electrotype shell engaging surface and means for holding the shell in position thereon by suction.

2. In a machine of the character described, an electrotype shell engaging surface, means for holding the shell in position thereon by suction and means for heating said surface.

3. In a machine of the character described, an electrotype shell engaging perforated surface and means for holding the shell thereon by suction.

4. In a machine of the character described, an electrotype shell engaging perforated surface, means for holding the shell thereon by suction and means for heating said perforated surface.

5. In a machine of the character described, a backing pan having an electrotype shell engaging surface and a suction device for holding the shell in position on said surface.

6. In a machine of the character described, a backing pan having an electrotype shell engaging surface, a suction device for holding the shell in position on said surface and means for heating said surface.

7. In a machine of the character described, a backing pan having an electrotype shell engaging perforated surface and a suction device for holding the shell in position on said perforated surface.

8. In a machine of the character described, a backing pan having an electrotype shell engaging perforated surface, a suction device for holding the shell in position on said perforated surface and means for heating said surface.

9. In a machine of the character described, a hollow backing pan having perforations through its electrotype shell engaging wall and means for exhausting the air from said pan for causing the shell to be held against said perforated wall by suction.

10. In a machine of the character described, a hollow backing pan having perforations through its electrotype shell engaging wall, means for exhausting the air from said pan for causing the shell to be held against said perforated wall by suction and means for heating said backing pan.

11. In a machine of the character described, a hollow backing pan having perforations through its electrotype shell engaging wall and an exhaust pump connected to the interior of the backing pan whereby the shell may be held in position on said perforated wall by suction, by the operation of the pump.

12. In a machine of the character described, a hollow backing pan having perforations through its electrotype shell engaging wall, an exhaust pump connected to the interior of the backing pan whereby the shell may be held in position on said perforated wall by suction, by the operation of the pump and means for heating said backing pan.

In testimony, that I claim the foregoing as my invention, I have signed my name in presence of two witnesses, this third day of January A. D. 1911.

CHARLES P. COTTRELL.

Witnesses:
    A. R. STILLMAN,
    G. BURDICH.